(12) United States Patent
Peller et al.

(10) Patent No.: US 7,950,018 B2
(45) Date of Patent: May 24, 2011

(54) SYNCHRONIZING EXECUTION USING A SINGLE-THREADED SCRIPTING MODEL

(75) Inventors: Adam L. Peller, Newton, MA (US); Zhiling J. Zheng, Champaign, IL (US)

(73) Assignee: International Business Machines Corporation, Armonk, NY (US)

( * ) Notice: Subject to any disclaimer, the term of this patent is extended or adjusted under 35 U.S.C. 154(b) by 1752 days.

(21) Appl. No.: 11/127,997

(22) Filed: May 12, 2005

(65) Prior Publication Data

US 2006/0031663 A1 Feb. 9, 2006

Related U.S. Application Data

(60) Provisional application No. 60/589,703, filed on Jul. 21, 2004.

(51) Int. Cl.
*G06F 3/00* (2006.01)
*G06F 9/44* (2006.01)
*G06F 9/46* (2006.01)
*G06F 13/00* (2006.01)

(52) U.S. Cl. ...................................................... 719/312

(58) Field of Classification Search .................... 719/312
See application file for complete search history.

(56) References Cited

U.S. PATENT DOCUMENTS

| | | | | |
|---|---|---|---|---|
| 4,395,757 A * | 7/1983 | Bienvenu et al. | ............. | 718/104 |
| 5,710,922 A * | 1/1998 | Alley et al. | ........................... | 1/1 |
| 7,216,351 B1 * | 5/2007 | Maes | ............................ | 719/328 |
| 2001/0054066 A1* | 12/2001 | Spitzer | ......................... | 709/203 |
| 2004/0233934 A1* | 11/2004 | Hooper et al. | ................ | 370/474 |

OTHER PUBLICATIONS

Adam Stock, "JavaScript Animation in Navigator 4.0 and MSIE 4.0 How to outsmart your browser", 1998, pp. 1-3.*

* cited by examiner

*Primary Examiner* — Andy Ho
*Assistant Examiner* — Timothy A Mudrick
(74) *Attorney, Agent, or Firm* — Marcia L. Doubet

(57) ABSTRACT

Providing synchronization of data between application instances that execute script, and in preferred embodiments, without the use of synchronization primitives in the script and without the ability to reschedule events in at least one of the instances. Blocking code is provided in the application instances that is adapted for checking a flag to be set by the other component. One component can thereby inform the other component when it is ready to receive data, and the other component can inform the one component when the other component is finished with the data. In one scenario, the provided synchronization enables a browser instance that is terminating to safely provide its data to a separate browser instance, and enables the separate browser instance to know when the provided data can safely be manipulated.

19 Claims, 4 Drawing Sheets

```
       // spawn a child browser instance
210    saveWin = window.open(childWindowURL, ...);

// wait until child is ready
       do {              /–230
220        modal_dialog(...);
       } while (typeof saveWin._safe == 'undefined');
                         \–240
       // child is now ready; allow transaction to proceed 250    // transaction-specific code, to be provided // transaction is now finished; signal child that parent has finished
260    saveWin._complete = true;
```

310 `<body onLoad="_safe = true; startSave()" ...>`

320 `function startSave() {`

330 {
```
        if (typeof _complete == 'undefined') {    — 340
            setTimeout(startSave, 2000);
            return;
        }
```
}

`}`

350 `// parent has now finished`

360 `// proceed to manipulate data transferred from parent ...`

370 `// child continues in transaction-specific manner`

SYNCHRONIZING EXECUTION USING A SINGLE-THREADED SCRIPTING MODEL

CROSS-REFERENCE TO RELATED APPLICATION

This application claims the benefit of Provisional Application Ser. No. 60/589,703, filed Jul. 21, 2004, the entire disclosure of which is hereby incorporated herein by reference.

BACKGROUND OF THE INVENTION

The present invention relates generally to content rendering environments (such as browsers and portals), and more particularly, enables scripting code within applications executing in such environments to provide synchronized operation.

Advanced script-based technologies have been used commonly and ubiquitously to build web applications because of their sophisticated features and small download footprint. Most browsers, including Internet Explorer, Mozilla, and Opera, have embraced the scripting technologies to allow advanced manipulation of the Document Object Model ("DOM") structures in which parsed data is stored for rendering.

While scripting provides a number of advantages, it also has drawbacks. Among these drawbacks is the lack of various safety features, as contrasted to compiled languages, such as type checking and even syntax checking. The threading model also differs among compiled languages and scripting technologies: whereas compiled languages typically allow multi-threading, scripting technologies typically do not.

When designing web applications for browser-based rendering, it is quite common for a designer to create an application that has multiple browser instances coexisting. For example, if a user selects a "Help" button graphic from a browser instance, the designer may implement the Help feature to pop up a separate browser window for rendering Help text. An application might also have multiple browser instances sharing data or communicating with each other by transferring data back and forth. However, unlike other high-level programming languages, scripting languages typically have a single-threaded execution model, and have no synchronization primitives (such as locks and semaphores) to ensure orderly data sharing and transfer. This can be further complicated by the use of native, multi-threaded methods which are called outside of the scripting model, and which create and modify browser instance data.

BRIEF SUMMARY OF THE INVENTION

In one aspect, the present invention comprises a method, system, and/or computer program product adapted for: providing, in code of a first component, a first blocking instruction that when executed, blocks until a first flag-setting instruction in code of a second component sets a first flag indicating that the second component has reached a ready state; providing, in the code of the second component, the first flag-setting instruction that when executed, sets the first flag, thereby allowing the first blocking instruction to unblock; providing, in the code of the second component, a second blocking instruction that when executed, blocks until a second flag-setting instruction in the code of the first component sets a second flag indicating that the first component reaches a finished state; and providing, in the code of the first component, the second flag-setting instruction that when executed, sets the second flag, thereby allowing the second blocking instruction to unblock.

In another aspect, the present invention comprises a method, system, and/or computer program product adapted for: executing, in code of a first component, a first blocking instruction that blocks until a first flag-setting instruction in code of a second component sets a first flag indicating that the second component has reached a ready state; executing, in the code of the second component, the first flag-setting instruction that sets the first flag, thereby allowing the first blocking instruction to unblock; executing, in the code of the second component, a second blocking instruction that blocks until a second flag-setting instruction in the code of the first component sets a second flag indicating that the first component reaches a finished state; and executing, in the code of the first component, the second flag-setting instruction that sets the second flag, thereby allowing the second blocking instruction to unblock.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined by the appended claims, will become apparent in the non-limiting detailed description set forth below.

The present invention will be described with reference to the following drawings, in which like reference numbers denote the same element throughout.

BRIEF DESCRIPTION OF THE SEVERAL VIEWS OF THE DRAWINGS

FIG. 2 provides sample code illustrating one manner in which synchronization aspects of preferred embodiments may be implemented within a parent browser;

FIG. 3 provides sample code illustrating one manner in which synchronization aspects of preferred embodiments may be implemented within a child browser.

DETAILED DESCRIPTION OF THE INVENTION

Figure 1:
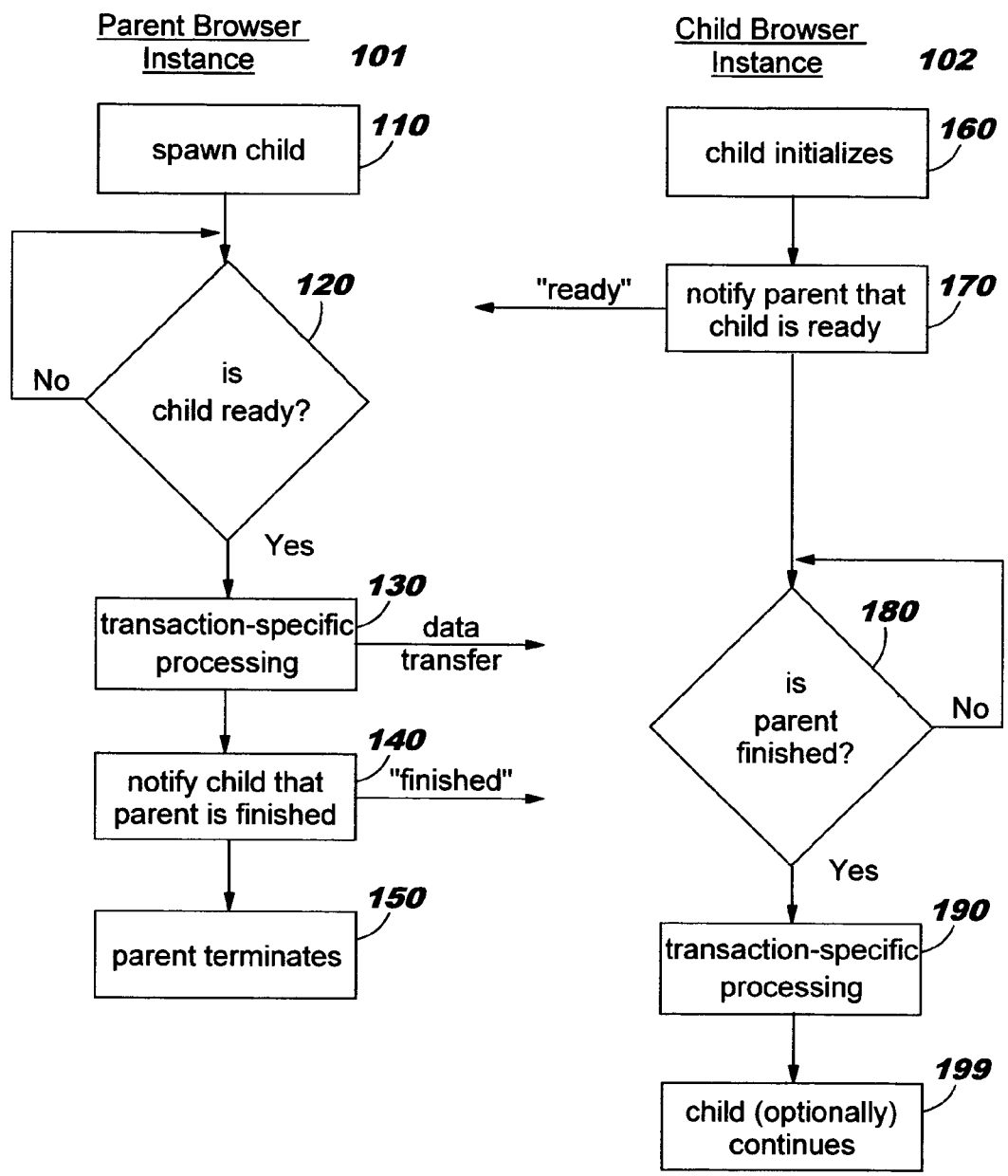
FIG. 1 provides a flow diagram illustrating how synchronization between a parent and child browser operates according to one or more embodiments of the present invention.

Embodiments of the present invention enable synchronizing execution in scripting, even though the script language itself does not provide synchronization primitives. Order of execution among instances can therefore be controlled.

Generally, commonly-used browsers allow multiple browser instances to execute simultaneously, but do not guarantee that the creation and access to browser data is synchronized between script and native code.

With the single-threaded execution model of scripting technologies, because creation of browser instances is performed outside the scripting model by native code, the lack of synchronization mechanisms for coordinating execution among multiple instances can be problematic. In a browser environment, for example, the inability to synchronize execution of multiple browser instances may result in a first browser instance attempting to transfer data to a just-launched second browser instance before the second browser instance is in a ready state. It would be preferable to ensure that the second browser instance is ready to accept data before allowing the first browser instance to attempt the data transfer. As another example, a terminating browser instance sometimes has no opportunity to pass its data to another browser or to schedule additional tasks, making communication with the server impossible and communication with other browser instances unreliable at best. If the browser is terminating unexpectedly, the inability to perform these tasks prevents the browser from being able to save its data and pass that data to another entity that will persist after the termination. In a number of environments, such as on-line banking or investment applications, this inability may prevent transactions from completing properly.

Generally, scripting languages have no synchronization primitives available. However, some scripting languages may have primitives for use in scheduling execution of code; in cases known to the present inventors, these primitives are insufficient when access to data structures may be manipulated not only by script but also by asynchronous native code (such as the underlying browser) that is not subject to the threading rules of the script. Native asynchronous method calls from the script may therefore have undesirable side effects.

As browser-based applications become more complex and advanced, the need to ensure data integrity during data transfer may become more prevalent.

According to preferred embodiments, generic multithreading concepts (such as locks and semaphores) are simulated to enable an application running in one browser instance to synchronize with script running in another browser instance. Preferred embodiments leverage synchronous native method calls and variables used as data flags.

It should be noted that while discussions herein are primarily in terms of browser-based applications, this is by way of illustration and not of limitation. Disclosed techniques may also be used with other platforms, such as portals and other content aggregation frameworks where multiple windows or views are commonly in coexistence, and with programming languages where native synchronization features cannot be assumed.

Using techniques disclosed herein, a parent browser that is terminating can synchronize with a child browser that is being spawned, and can reliably transfer data to the child. This scenario includes an unexpected close of a browser window, which could be initiated (for example) by the user (either accidently or on purpose), and guards against data loss due to unpredictable browser behaviors. A typical scenario is when a child browser instance is spawned using script, the parent and child browser instances execute asynchronously, and the processing order of the parent and child is undefined. The present invention provides techniques to programmatically synchronize browser instances, thereby enabling a safe and complete data transfer from one browser instance to another, such as from the parent to the child. Furthermore, programmatic synchronization may be carried out among multiple browser instances which are not in a parent/child relationship.

Additional scenarios exist where multiple browser instances may coexist. In a portal page, for example, content from a number of content emitters (commonly referred to as "portlets") may be aggregated for rendering within the browser window that provides the portal page, yet there may be cases where content from another content emitter is placed in a separate browser instance (such as a relatively large table or spreadsheet) according to the web page designer's choice, and techniques disclosed herein may be used for saving data entered in that separate browser instance. Or, the web page designer may wish to present information visually outside the context of a single browser window for other reasons. For example, it might be desirable to establish a browser instance with a different lifespan, or a browser window that will be positioned on a different part of the graphical user interface, and techniques disclosed herein enable synchronizing communication with such browser instances. (In some cases, a spawned browser instance does not require interaction or synchronization with its parent. A common example is a pop-up advertisement which may be generated from script or markup language of a web page. Preferred embodiments are directed toward scenarios where synchronization is needed.)

According to preferred embodiments, checks are performed in both directions (i.e., from each browser instance) to assure orderly and complete data transfer. Data transfer can then take place when both browser DOMs are in a ready state. When browser instances are synchronized, using techniques disclosed herein, one instance can reliably begin a data transfer when the other instance is ready, and the other instance can reliably know that the data transfer is complete before it proceeds to manipulate the data. A terminating browser instance can reliably know that its data has been fully passed to another browser instance before the terminating browser releases its timeslice and goes out of scope. (Note that discussions herein of a browser's data are not limited to the browser's internal state data. Other types of data that a browser may desire to pass to another instance, rather than allowing that data to be lost upon the browser's termination, include data in a web application, such as values a user has entered into a field rendered in the browser, the state of a checkbox or other user interface widget, and so forth. Techniques disclosed herein enable passing data to the server for saving or other application-specific usage. Embodiments of the present invention may optionally provide the user with a choice to confirm the saving of the data.)

It should be noted that the browser instance to which a browser passes its data may, in some cases, be invisible to the end user. This may be the case, for example, when a child browser is spawned for saving the data from a browser instance being terminated (where the programmer may have identified the termination as an abnormal part of execution flow and therefore provided code to spawn the child).

Because browser scripting is single-threaded, typical operation of scripts in a browser uses an event queue, and a thread started by the enclosing application (i.e., the web browser) maintains a queued list of script to be executed at given points in time. Script may be added to this event queue, either by content in the browser or by the script itself. As an example of the former, a page may be loaded that contains scripting code or that otherwise triggers execution of script, perhaps as a result of a user clicking on a graphical button. As an example of the latter, a triggered script might contain code for executing a particular command after a specified delay period, such that the to-be-executed command is queued on the event queue. When a piece of executing script code finishes, the event queue then either finds another piece of code which is ready to run, or waits until it is time for the next queued script to run.

When a browser closes, an "onclose" event is fired. An "onclose" handler script is then invoked (where the "handler script" is code that has been defined as being invocable upon the firing of this event). While the handler script will run to completion, script still queued on the event queue can no longer be guaranteed to run. Thus, the event queue of the terminating browser is generally in an unknown and unpredictable state (and is about to be destroyed, along with any events on the queue); if the handler is allowed to return control to its invoking code, the browser instance will be destroyed. Absent techniques disclosed herein, scheduling additional scripts or handlers to run in the parent (for example, to carry out processing in response to particular watched-for data, or for submitting a form to the server) will therefore not work. When the single-threaded script needs to call out to the multi-threaded environment (e.g., to create a new browser instance), calls back to the terminating browser are not possible. Furthermore, prior art approaches known to the inventors do not allow execution of input/output operations that could safely save data in a persistent, external data store (e.g., on the server).

Preferred embodiments will now be discussed in more detail, showing how synchronization is provided between browser instances. As one use of this synchronization, data from a terminating browser can be "rescued" by opening a child browser window and using the synchronization to safely and reliably pass the terminating browser's data to that child.

FIG. 1 provides a flow diagram 100 illustrating how synchronization between a parent and child browser operates according to one or more embodiments of the present invention. (FIGS. 2 and 3, discussed below, provide sample code which illustrates in more detail how this synchronization may be implemented.) As shown at Block 110, a parent browser instance 101 spawns a child browser instance 102 and in response, the child 102 opens and initializes its instance (Block 160). Each browser instance then executes using its own event queue thread. Rather than allowing the parent to continue executing asynchronously, as in prior art approaches, these embodiments use an approach which is referred to as a "spin-lock variable" to ensure that the parent waits until the child reaches a ready state before transferring data to the child. (The spin-lock variables discussed herein are not actual spin-lock variables of the type provided by some compiled languages, but are used for achieving synchronization results as will be discussed.) Accordingly, Block 120 depicts testing whether the child instance is ready, and if this test has a negative result, the parent yields using a native method on the platform with that side effect and loops at Block 120 until the test has a positive result.

When the child completes its initial processing, it notifies the parent (Block 170) that it is ready. In one or more embodiments of the present invention, this notification is facilitated by each browser having a reference to the other, whereby each browser can get and set properties of the other browser instance using variable expressions and assignments. The child can therefore set a variable to indicate its ready status, and the parent can get this variable status. (See, for example, code at reference numbers 310 of FIG. 3 and 240 of FIG. 2, as discussed below.) When the parent receives this notification, it can be assured that passing data to the child will be a safe operation (that is, the child instance is known to be ready for receiving data). Accordingly, the parent can continue on to perform transaction-specific processing, including data transfer, as shown at Block 130.

Concurrently, the child cannot yet safely assume that data sent by the parent is ready for processing by the child. The child therefore uses another spin-lock variable, rather than continuing asynchronously, thereby ensuring that the child waits until the parent completes processing of data which it is sharing with the child. Accordingly, Block 180 depicts the child instance testing whether the parent instance is finished with its data transfer (and other transaction-specific processing, as necessary), and if this test has a negative result, the child loops at Block 180 (preferably by rescheduling itself on the event queue, thus yielding to other operations) until the test has a positive result. (Note that the spin-lock variables referred to herein are unlikely to have native support for blocking a thread or yielding control, as contrasted to actual spin-lock variables in other programming languages.)

When the parent completes its processing, it notifies the child (Block 140) that it is finished. (As discussed above, this notification is preferably implemented by each browser having a reference to the other and setting/getting properties.) When the child receives this notification, it can be assured that the data passed from the parent is in a steady state, and that modifying or otherwise using this data is a safe operation. Accordingly, the child continues on to perform transaction-specific processing, which may include using the data, as shown at Block 190. As one example, the child may take actions such as transmitting the received data to the server for persistent storage.

When the parent notifies the child that it is finished, the parent may then terminate its processing (Block 150) and release its timeslice. State data of the parent is released as well, with the parent having reliably transferred at least some portion of its data (as determined in a transaction-specific manner) to the child using techniques described herein. The child may optionally continue to execute (Block 199) on its own execution path.

FIG. 2 provides sample code 200 illustrating one manner in which synchronization aspects of preferred embodiments may be implemented within a parent browser. In this code, the variable "saveWin._safe" is used as a spin-lock variable to be checked from the parent browser (see 240) after the parent spawns the child browser (see 210). Generally, issuing the "window.open( . . . )" command at 210 creates a new browser instance (using native code in the browser), returns a reference to this new browser to the issuer of the command, and content and/or script may be loaded in the new browser instance. In some browser implementations, the "window.open( . . . )" command is asynchronous and will return immediately, whether or not the new browser instance has been populated. If the parent tries to assign values to properties of the newly-created instance (for example, to transfer data values thereto) too soon, a failure may therefore occur. Accordingly, in the sample code, the parent loops while awaiting the child's setting of the "saveWin._safe" spin-lock variable. Since the spin-lock variable does not block the browser instance from running or yielding control, and there is no native "yield" operation in the scripting code, a yield or pausing of execution is provided in the parent (see, generally, 220), where the sample code presents a modal dialog (see 230). A modal dialog to which a user responds may be used; in another approach, a modal dialog might be used with a timer, whereby the current thread is paused for a certain time and then gives control back to the thread when the timer expires. Moreover, the modal dialog used to control execution could be implemented as an invisible dialog which would make the rescheduling transparent to the user. As the modal dialog pauses execution of the current thread and thereby gives control to the underlying browser implementation, it allows other browser threads to schedule events and execute code, such as the creation of the child browser window and its data instance (e.g., a DOM to be used by the child). This produces a similar effect to a yield primitive. When the modal dialog is closed, the blocked script thread wakes up and resumes its execution. (Techniques other than a modal dialog may be used in other embodiments without deviating from the scope of the present invention. Preferably, if another technique is substituted for the modal dialog, a substitute technique is selected that uses a native, synchronous method which will yield control to other system and user interface threads. A method might be written using native code to enforce a yield, for example.)

Once the spin-lock variable has been set by the child, the parent's execution flow continues, and transaction-specific processing—which, in preferred embodiments, includes passing data to the child—occurs (see 250).

By keeping the parent browser instance in scope while the child instance is initializing, scripting is kept alive in the parent and the data stored in its DOM remains accessible to the child. Once the parent completes its processing, it sets another spin-lock variable "saveWin._complete" to true (see 260), where the child processing is adapted to await this setting.

It is not strictly necessary that the terminating browser opens a new browser instance. Alternatively, the terminating browser may pass its data to a previously-existing browser instance, after ensuring that the browser instance remains active (e.g., where the previously-existing browser instance is adapted for setting the "saveWin._safe" variable that will be checked by the terminating browser).

FIG. 3 provides sample code 300 illustrating one manner in which synchronization aspects of preferred embodiments may be implemented within a child browser. As shown in FIG. 3, code 310 of the child initializes the "saveWin._safe" spin-lock variable when the child is loaded, thus notifying the parent that the child has reached the ready state, and then invokes a script which (in this example) is named "startSave". Using this sample "startSave" function, a "yield" or pausing of execution occurs in the child (see, generally, 330) by rescheduling itself on the event queue, awaiting the parent's setting of the "saveWin._complete" spin-lock variable (see 340). If this variable is not set, a delay timer is started, where its parameter will be evaluated after the specified number of milliseconds elapses. In the sample code, the parameter specifies that the startSave function will be executed again, such that the child loops until the "saveWin._complete" variable has been set by the parent. (Techniques other than using a delay timer may be used without deviating from the scope of the present invention.)

Note that the child may safely use its event queue after it has been loaded, since the child's event queue is separate from that of the to-be-terminated parent.

Once the "saveWin._complete" spin-lock variable has been set by the parent, the child can be assured that the parent has completed (as noted at 350) and the child's execution flow can then safely continue (see 360), including use of the data passed to the child by the parent (or data which the child may otherwise obtain from the parent, for example by accessing the parent's DOM or properties of the parent browser instance using getter-style methods). The child browser may then continue to execute, if desired, depending on transaction-specific needs of the application (see 370).

As has been demonstrated, the present invention provides synchronization techniques that enable ensuring a particular ordering of events even though the scripting technology does not provide synchronization primitives. The sequence in which data is created and destroyed can therefore be controlled from script, and unsaved data in a terminating browser can be saved by transferring the data to another browser. While preferred embodiments have been discussed with reference to ensuring ordering for passing data and using the passed data, however, this is by way of illustration and not of limitation. Furthermore, embodiments of the present invention are not limited to use with distinct browser instances, and synchronization techniques disclosed herein may be used to synchronize execution ordering in scenarios that include a single browser instance with multiple execution flows that correspond to separate tabbed browser panels.

As will be appreciated by one of skill in the art, embodiments of the present invention may be provided as methods, systems, and/or computer program products comprising computer-readable program code. Accordingly, the present invention may take the form of an entirely hardware embodiment, an entirely software embodiment, or an embodiment combining software and hardware aspects. In a preferred embodiment, the invention is implemented in software, which may include (but is not limited to) firmware, resident software, etc.

Furthermore, the invention may take the form of a computer program product accessible from computer-usable or computer-readable media providing program code for use by, or in connection with, a computer or any instruction execution system. For purposes of this description, a computer-usable or computer-readable medium can be any apparatus that can contain, store, communicate, propagate, or transport a program for use by, or in connection with, the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, removable computer diskette, random access memory ("RAM"), read-only memory ("ROM"), rigid magnetic disk, and optical disk. Current example of optical disks include compact disk with read-only memory ("CD-ROM"), compact disk with read/write ("CD-R/W"), and DVD.

Figure 4:
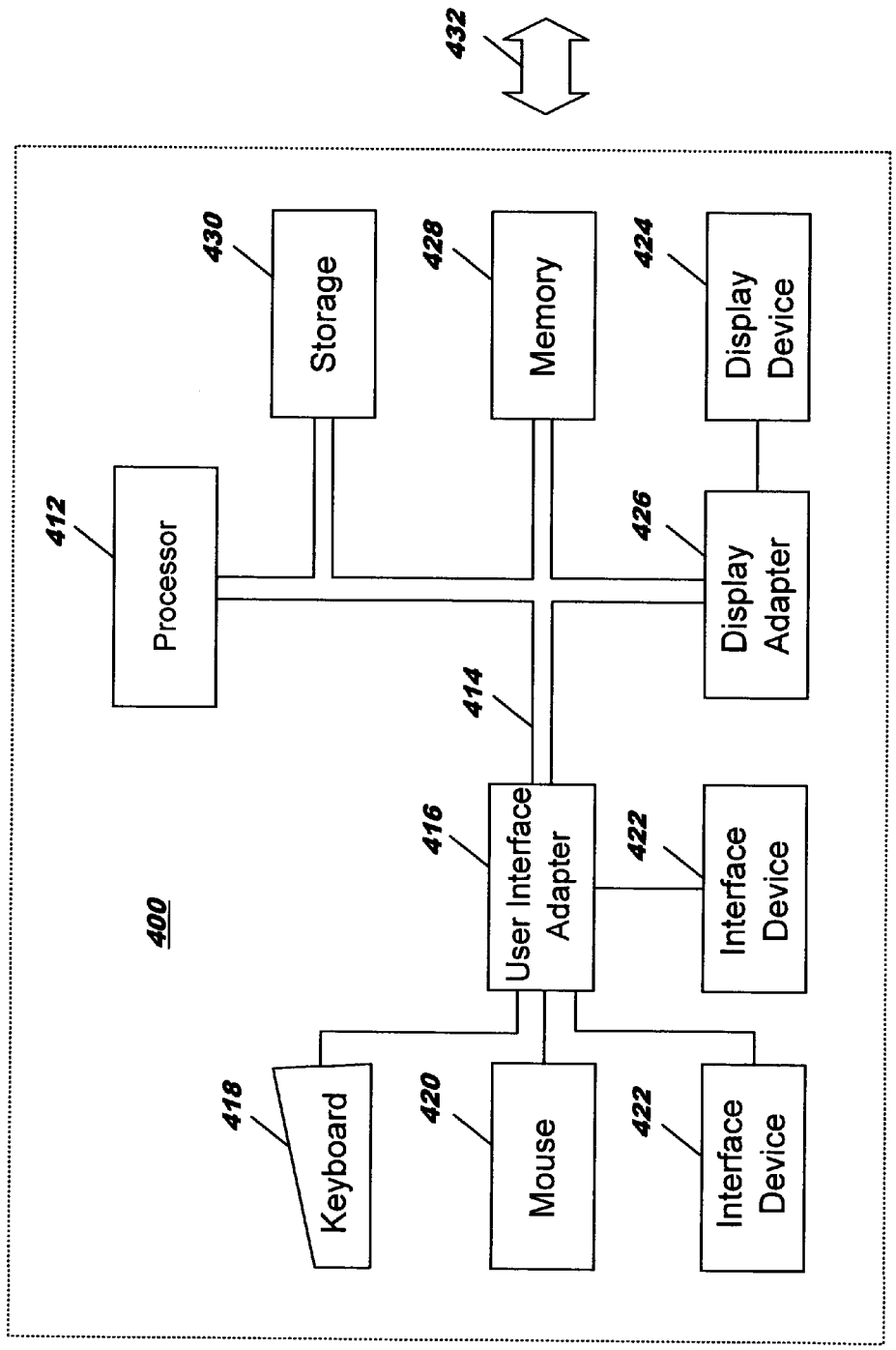
FIG. 4 depicts a data processing system suitable for storing and/or executing program code.

Referring now to FIG. 4, a data processing system 400 suitable for storing and/or executing program code includes at least one processor 412 coupled directly or indirectly to memory elements through a system bus 414. The memory elements can include local memory 428 employed during actual execution of the program code, bulk storage 430, and cache memories (not shown) which provide temporary storage of at least some program code in order to reduce the number of times code must be retrieved from bulk storage during execution.

Input/output (I/O") devices (including but not limited to keyboards 418, displays 424, pointing devices 420, other interface devices 422, etc.) can be coupled to the system either directly or through intervening I/O controllers or adapters (416, 426).

Network adapters may also be coupled to the system to enable the data processing system to become coupled to other data processing systems or remote printers or storage devices through intervening private or public networks (as shown generally at 432). Modems, cable modem attachments, wireless adapters, and Ethernet cards are just a few of the currently-available types of network adapters.

While preferred embodiments of the present invention have been described, additional variations and modifications in those embodiments may occur to those skilled in the art once they learn of the basic inventive concepts. Therefore, it is intended that the appended claims shall be construed to include preferred embodiments and all such variations and modifications as fall within the spirit and scope of the invention. Furthermore, it should be understood that use of "a" or "an" in the claims is not intended to limit embodiments of the present invention to a singular one of any element thus introduced.

The invention claimed is:

1. A computer-implemented method of synchronizing execution without synchronization primitives, comprising:
   providing, in code of a first browser instance, a first blocking instruction that when executed on a computer, blocks by iteratively launching a modal dialog and waiting until the modal dialog closes before the first browser instance checks to see if a first flag-setting instruction in code of a second browser instance has set a first flag indicating that the second browser instance has reached a ready state;

providing, in the code of the second browser instance, the first flag-setting instruction that when executed on the computer, sets the first flag, thereby allowing the first blocking instruction to unblock;

providing, in the code of the second browser instance, a second blocking instruction that when executed on the computer, blocks until a second flag-setting instruction in the code of the first browser instance sets a second flag indicating that the first browser instance reaches a finished state; and providing, in the code of the first browser instance, the second flag-setting instruction that when executed on the computer, sets the second flag, thereby allowing the second blocking instruction to unblock.

2. The method according to claim 1, wherein the first blocking instruction is implemented using a native code instruction that yields control without rescheduling, after which the first browser instance can check to see if the first flag is set.

3. The method according to claim 1, wherein the second blocking instruction sets a delay timer and waits until the timer expires before the second browser instance continues checking to see if the second flag is set.

4. The method according to claim 1, wherein the first browser instance makes its data available to the second browser instance only after the second browser instance has reached the ready state.

5. The method according to claim 4, wherein the data of the first browser instance is made available from a document object model of the first browser instance and is stored into a document object model of the second browser instance.

6. The method according to claim 1, wherein the second browser instance uses data made available from the first browser instance only after the first browser instance has reached the finished state.

7. The method according to claim 1, wherein the code of the first browser instance and the code of the second browser instance is scripting code.

8. The method according to claim 1, wherein neither the code of the first browser instance nor the code of the second browser instance supports synchronization primitives.

9. The method according to Claim 1, wherein the modal dialog is not visible to a user.

10. The method according to claim 1, wherein the modal dialog closes responsive to action of a user.

11. A system for synchronizing execution without synchronization primitives, comprising:

a computer comprising a processor; and instructions which are executable, using the processor, to perform functions comprising:

executing, in code of a first browser instance, a first blocking instruction that blocks by iteratively launching a modal dialog and waiting until the modal dialog closes before the first browser instance checks to see if a first flag-setting instruction in code of a second browser instance has set a first flag indicating that the second browser instance has reached a ready state;

executing, in the code of the second browser instance, the first flag-setting instruction that sets the first flag, thereby allowing the first blocking instruction to unblock;

executing, in the code of the second browser instance, a second blocking instruction that blocks until a second flag-setting instruction in the code of the first browser instance sets a second flag indicating that the first browser instance reaches a finished state; and executing, in the code of the first browser instance, the second flag-setting instruction that sets the second flag, thereby allowing the second blocking instruction to unblock.

12. The system according to claim 11, wherein the second blocking instruction sets a delay timer.

13. The system according to claim 11, wherein the code of the first browser instance uses the first flag to prevent the first browser instance from making its data available to the second browser instance before the second browser instance reaches the ready state.

14. The system according to claim 11, wherein the code of the second browser instance uses the second flag to prevent the second browser instance from using data made available from the first browser instance before the first browser instance has reached the finished state.

15. The system according to claim 11, wherein the code of the first browser instance and the code of the second browser instance is scripting code that does not support synchronization primitives.

16. A computer program product for synchronizing execution without use of synchronization primitives, the computer program product comprising computer-readable code embodied on one or more computer-usable storage media, the computer-readable code comprising instructions that when executed on a computer cause the computer to:

execute, in code of a first browser instance, a first blocking instruction that blocks by iteratively launching a modal dialog and waiting until the modal dialog closes before the first browser instance checks to see if a first flag-setting instruction in code of a second browser instance has set a first flag indicating that the second browser instance has reached a ready state;

execute, in the code of the second browser instance, the first flag-setting instruction that sets the first flag, thereby allowing the first blocking instruction to unblock;

execute, in the code of the second browser instance, a second blocking instruction that blocks until a second flag-setting instruction in the code of the first browser instance sets a second flag indicating that the first browser instance reaches a finished state; and execute, in the code of the first browser instance, the second flag-setting instruction that sets the second flag, thereby allowing the second blocking instruction to unblock.

17. The computer program product according to claim 16, wherein the code of the first browser instance and the code of the second browser instance is scripting code.

18. The computer program product according to claim 16, wherein neither the code of the first browser instance nor the code of the second browser instance supports synchronization primitives.

19. The computer program product according to claim 16, wherein:

the first blocking instruction is provided in code that is invoked when the first browser instance is terminating;

the first blocking instruction is implemented using native code that yields control without rescheduling; and the second blocking instruction is provided in code of the second browser instance that is rescheduled upon determining that the second flag-setting instruction has not yet set the second flag.

* * * * *